United States Patent [19]

Schäffer et al.

[11] Patent Number: 4,863,485
[45] Date of Patent: Sep. 5, 1989

[54] FUEL BRIQUETTES

[75] Inventors: Hans G. Schäffer, Aachen; Wolfgang Cieslik, Bornheim-Sechten; Heinz Opdenwinkel, Aachen; Axel Vogts, Stolberg; Günter Poppel, Düren-Niederau; Horst Schürmann, Düren, all of Fed. Rep. of Germany

[73] Assignee: Akzo NV, Arnhem, Netherlands

[21] Appl. No.: 287,643

[22] Filed: Dec. 20, 1988

Related U.S. Application Data

[63] Continuation of Ser. No. 4,755, Jan. 8, 1987, abandoned, which is a continuation of Ser. No. 603,212, Apr. 23, 1984, abandoned.

[30] Foreign Application Priority Data

Apr. 23, 1983 [DE] Fed. Rep. of Germany ....... 3314764

[51] Int. Cl.$^4$ ................................................ C10L 5/00
[52] U.S. Cl. ...................................... 44/16 R; 44/24; 44/25
[58] Field of Search ................ 44/10 D, 10 R, 15 A, 44/15 D, 16 C, 16 R, 24, 10 C, 25

[56] References Cited

U.S. PATENT DOCUMENTS 4,226,601 10/1980 Smith .................................. 44/10 D
4,356,000 10/1982 Chappell ............................ 44/26 X
4,586,936 5/1986 Schäffer et al. .................... 44/10 C

FOREIGN PATENT DOCUMENTS 888687 8/1981 Belgium .
80493 5/1982 Japan .
0142982 8/1983 Japan .

Primary Examiner—Glenn Caldarola
Attorney, Agent, or Firm—Michael J. Striker

[57] ABSTRACT

The process is disclosed for the manufacture of briquettes in which an essentially solid fuel material such as hard coal, coke, soft coal, charcoal or more particularly, anthracite, and other coals of low volatility are mixed in the presence of polyvinyl alcohol and calcium oxide and/or magnesium oxide, as well as at least 1 percent by weight of water, and formed into briquettes. The calcium oxide is preferably caustic lime. The polyvinyl alcohol is preferably applied as an aqueous solution. The briquettes so formed are characterized by high initial crush resistance, i.e. the solidity shortly after the briquetting process, by high abrasion resistance, easy handling and, in the event that anthracite is employed, a carbon tar index of less than 50. The waste gases emitted during the burning of these briquettes have a distinctly reduced $SO_2$ content.

8 Claims, No Drawings

FUEL BRIQUETTES

This application is a continuation of application Ser. No. 004,755, filed Jan. 8, 1987, abandoned, which is in turn a continuation of application Ser. No. 603,212 filed Apr. 23, 1984 abandoned.

BACKGROUND OF THE INVENTION

The present invention concerns fuel briquettes based upon substantially solid fuels such as hard coal, coke, brown coal, wood coal and the like, which in the presence of synthetic organic compounds as binding agent and under employment of a further additive are obtained by means of briquettization, as well as a process for the production of such fuel briquettes.

It is known to manufacture briquettes by means of pressing of powder shaped or fine-grained or course-grained or in some other such manner particulated fuel material.

A series of fuel materials already naturally possess a binding agent, e.g. brown coal, other types of coal, e.g. anthrecite or mixtures of anthrecite with other types of coal must, however, still have added a binding agent in connection with the briquettization operation, in order that there may result briquettes which display a sufficient content of the fuel material and therewith also sufficient strength and a corresponding firing behavior.

The addition of the binding agent should however not only increase the holding together of the briquetted material, so that in connection therewith a better handleability of the briquettes is possible, but it should also improve the briquette character of the pressed material during the briquettization operation per se, e.g. in order to make possible a better plasticization during the shaping process. Moreover, the additives should favorably influence the burning behavior of the fuel material such as the efficiency upon combustion, the formation of exhaust and the like as much as possible.

In both patent and also otherwise technical literature there have already been described numerous binding agents, which are supposed to be employed upon the briquettization of coke, anthracite, mager- or so-called fat coal or coal mixtures and the like.

The previously known techniques display, however, disadvantages, from different points of view. Thus, for example, the use of pitch and asphalt bitumen as binding agent leads to briquettes which upon combustion, smoke strongly and disintegrate too quickly on account of softening of the binding agent. This leads u.a. to the result that upon combustion the material present is not completely utilized and leaves noticeable in the ash a still very great amount of non-combusted coal material.

Hard coal tar pitch as binding agent has the disadvantage that it occurs containing carcinogenic substances therein. Accordingly, this use should be avoided as much as possible. The employment of pitch is therefore forbidden as binding agent for briquettes which are supported to serve as houshold-type material, for reasons of enviromental protection. For example, according to the federal emissions protection laws of 1976 in West Germany, such briquettes can only be employed in ovens of the type which an after-combustion of the exhaust gas occurs.

In Gluckauf-Forschungshefte 36 (4) 156-61 (1975) numerous synthetics are mentioned which have been employed as binding agent for the production of hard coal briquettes. It is there maintained that aqueous dispersions of synthetics (plastics and the like) lead to briquettes with "Russ" tar numbers lying above 300 and thus cannot be spoken of as low-exhaust briquettes, for which it is indicated, must possess a "Russ" tar number below 200.

For an entire series of synthetic materials further cited therein, the relatively higher portion of the synthetic material is necessary, in order to obtain a sufficient binding of the fuel material in connection with the briquettization technique. With several of the there-mentioned synthetic materials it is difficult to obtain a sufficiently homogeneous inter-mixing of fuel material and binding agent. It is also necessary in a series of instances to employ mixtures of different coals. Finally, several of the there-mentioned synthetics require yet an addition of a further organic adjuvant, e.g. an addition of oil. Moreover, several of the there-given synthetic materials have a tendency to form upon combustion gas, which can lead to odor problems.

DE-OS3114141 describes a co-use of polyvinyl alcohol as synthetic binding agent. According to the teachings of this reference, however, a still cationic polyurethane is employed, so as to obtain sufficient strength. The initial strengths of the there-described fuel briquettes likes, as a rule, relatively low.

It is common to all the previously mentioned compositions that the sulphur present in the fuel material is not sufficiently retained during the combustion whereby the result can be that a large part can be let into the atmosphere with the combustion gas in the form of gaseous sulphur compounds, such as sulphur dioxide.

Whether or not numerous techniques are already known for the manufacture of fuel briquettes using binding agents and other such additives, there exists still a need for improved processes for the production of fuel briquettes, which processes result in briquettes having favorable chemical characteristics and advantageous burning behavior, and the combustion gas of which contained less substances that can lead to an environmental burden.

SUMMARY OF THE INVENTON

It is therefore an object of the present invention to provide a process whereby in simple manner through briquettization of essentially solid fuel materials can be prepared fuel briquettes which contain an organic binding agent as well as further addition(s), such briquettes displaying good handleability and also, in particular, at already a short time after the pressing operation, a sufficient strength, i.e. they possess a good initial strength, so that the working up can be effected as quickly as possible and that they can then be available for being transported.

It is a further object according to the present invention to make available briquettes which distinguish through good burning characteristics, such as efficiency, firing strength, and the like, and the combustion gas of which contains smaller amounts of sulphur-containing compounds.

This object is attained according to the present invention by a method for the production of fuel briquettes with the presence of synthetic organic compounds as binding agent as well as a further additive, the process being thereby characterized in that one mixes a substantially solid fuel material, polyvinyl alcohol and calcium oxide and/or magnesium oxide in the presence of at least 1.0 percent by weight water with one another, and which then in known manner are formed into briquettes by means of pressing.

The calcium oxide can be employed in the form of burnt lime. Preferably, 0.5–4.5 percent by weight calcium oxide, relative to the dry weight of the solid fuel material, is employed.

It is a preferred embodiment according to the present invention, however, to employ between 1 and 3 percent by weight of the calcium oxide.

The polyvinyl alcohol is expediently used in amounts between 0.5 and 2 percent by weight, calculated as dry substance, and relative to the solid fuel material. The polyvinyl alcohol can be employed in aqueous solution, whereby a 15 to 18 percent aqueous solution is preferred.

The calcium oxide can be substituted by means of calcium hydroxide up to 50 percent, in particular up to 20 percent.

It is a preferred embodiment according to the present invention that anthracite is particularly suitable as the substantially solid fuel material. Upon the production of the fuel briquettes according to the present invention, the briquettization mixture can possess at least 95 percent of substantially solid fuel mixture, calculated as dry substance.

According to a particularly advantageous embodiment of the process according to the present invention, the briquettization is performed at temperatures from 20° to 50° C., even more particularly at ambient or surrounding temperature.

The water content of the mixture can be adjusted by means of infusation or blowing-in of steam.

The subject of the present invention also extends to fuel briquettes which have been obtained through briquettization of a mixture prepared by intermixing of substantially solid fuel material, polyvinyl alcohol and calcium oxide and/or magnesium oxide in the presence of at least 1.0 percent by weight water. Low-volatile coal is a favored fuel material for the fuel briquettes, so that anthracite is particularly suitable.

The fuel briquettes can display an initial press strength from 100 up to 250 N/cm$^2$, measured after a hardening period of 20 minutes after the pressing operation. The fuel briquettes according to the present invention are distinguished, moreover, in particular, by a trommel strength of at least 80 percent, preferably at least 90 percent. The fuel briquettes according to the present invention, which have been obtained using low-volatile coal, in particular anthracite, preferably possess a "Russ" tar number of less than 50.

For the performance of the process according to the present invention, initially the pulverized solid fuel, which can be provided in the form of grains, dust, so-called oven pieces, or the like, which listing is not intended to be limitative either in scope or of type, the binding agent, namely polyvinyl alcohol, preferably in aqueous solution, and the calcium oxide or magnesium oxide or a mixture of both of such oxides, are in customary manner mixed together with one another.

It has been shown that the three components can meld closely with one another in a favorable manner within short times. The polyvinyl alcohol distributes very well and uniformly within the briquettization material, particularly when it is employed in the form of an aqueous solution, so that a very good holding-together of the briquettization material is attained during the customary briquettization operation, the result being fuel briquettes which are very homogeneous and which, accordingly, display a very uniform interior structure as a rule.

It lies within vthe scope of the present invention to work with all customary solid carbon-containing fuel materials of the ordinary granulations. There can be worked up fuel materials which display a customarily broad spectrum of grain sizes. However, one can also employ fuel materials which display a relatively narrow grain size range. The size of the grains and the distribution of the grain sizes can best be determined through customary sieve analysis.

Within the scope of the present invention the most different types of solid fuel materials can be employed. Thus, hard coal of any type can be briquetted, such as e.g. so-called flame coal, fat coal and "Mager" coal. Particularly suitable are lower-volatile coals, such as e.g. anthracite. Under the designation lower-volatile coals are to be understood such coals which contain a low content of volatile components. With these components one is involved with the gas and vapors that develop upon the heating of the coal at 900° C. and the exclusion of air. Indeed, the less volatile components a coal contains, thus the higher is the portion of carbonaceous material.

Also useful in accordance with the present invention are brown coals of the most different types and from various provinces as well as wood coal. It is also possible to mix the different types of coal with one another and to lead them in such manner into the briquettization operation.

Polyvinyl alcohol is a known, commercially obtainable product, which preferably is manufactured by means of saponification of polyvinyl acetate. Polyvinyl alcohols with the most different degrees of polymerization, respectively viscosities, can be employed.

Within the scope of the present invention, suitable commercially available polyvinyl alcohols include e.g. those from the firm of Hoeschst AG, Franfurt/Hoeschst under the commercial designation MOWIOL. Such polyvinyl alcohols are more closely described in the firm prospectus, available at the date of the application, B1 "Das MOWIOL-Sortiment" and A1 "Zur Geschichte des MOWIOLS" (Farbwerke Hoechst AG G1103, September 1976).

Particularly suitable are completely saponified polyvinyl alcohols, i.e. polyvinyl alcohols which display acetyl groups whether or not at all, or only to a subordinate extent.

Within the scope of the present invention it is the addition of the polyvinyl alcohol, preferably as an aqueous solution, to the briquetting material. Appropriate aqueous solutions can be manufactured either from water and dry polyvinyl alcohol, or polyvinyl alcohol can also be supplied as aqueous solution of varying viscosities.

The viscosity of the aqueous solution depends upon the concentration of the dissolved polyvinyl alcohol, its molecular weight and, obviously, also upon the temperature of the solution. The viscosity of the solution can fluctuate within broad limits indeed according to molecular weight, concentration and temperature, and lies generally within the order of magnitudes from 1 up to 10,000 mPa.s. Very suitable within the scope of the present invention are aqueous polyvinyl alcohol solutions having a concentration from 15 to 18 percent polyvinyl alcohol.

The polyvinyl alcohol melds very well with the customary components of the briquettization mixture, particularly when it is provided as aqueous solution, and distributes itself uniformly within the briquettization mass.

Calcium oxide can be employed in pure form, or as a technical product. Preferably, burnt lime is employed. It is self-evident that the calcium oxide is brought to a granulation which allows for a uniform intermixing with polyvinyl alcohol and the solid fuel material. Suitable for this purpose are calcium oxide products of the customary granulation. More specific indications as to the granulation of the calcium oxide may be found in DIN1060.

As mentioned above, magnesium oxide can replace the calcium oxide either partially or completely. In this instance, too, that component may be employed in pure form or in technical form. Employable mixtures of calcium oxide and magnesium oxide are prepared by intermixing the both of said oxides, on the one hand. However, it is also quite possible to work with a preliminary procedure designed to otherwise provide such a mixture of said oxides.

For example, calcium or magnesium oxides which arise through combustion of naturally occurring calcium- and/or magnesium-containing carbonates are well suitable. In connection with said carbonates, mention should be made also of the sediment rocks such as are described in Ullmanns Encyclopedia of Technical Chemistry, 4th edition, volume 13, pages 497 et seq., particularly page 498.

The mixing of the individual components, namely the solid fuel material, such as e.g. pulverized hard coal, anthracite and the like, the calcium oxide and/or magnesium oxide, as well as the employed polyvinyl alcohol, can be performed in customary manner. Suitable for this purpose are the typical mixing arrangements. It is without more possible, within the scope of the present invention, to mix the components cold; however, in many cases it is indicated for a mixing at higher temperatures, e.g. at 80° C.

Water content, which is necessary upon the mixing of the solid fuel material, the polyvinyl alcohol and the calcium- and/or magnesium oxide, can be obtained in simple manner. Thus, e.g. an appropriate water content is in many cases already obtained when one adds the polyvinyl alcohol in the form of an aqueous solution.

Another possibility is to blow water vapor into the mixture. In such manner not only is the water content adjusted, respectively elevated, but there occurs also a temperature elevation of the mixture, which can be of advantage of the mixing and the pressing operations.

By means of adjustment of the water content and temperature, one can also influence the dwell time in the mixer required in order to obtain a suitable briquettable mixture that is free from dust and the like, or other known problems connected with such mixtures.

The more dilute the aqueous polyvinyl alcohol solution, or the more steam is blown therein, just the much faster does the polyvinyl alcohol distribute itself into the mixture, in order to better for the binding agent to be generally also activated.

The water content should amount to at least 1.0 percent by weight of the mixture, useful values lying also above this same number and running e.g. to 3 or 5 percent and more. A series of types of coal, particularly brown coal, possess even a higher water content, so that upon mixing further parameters come into consideration in so far as it may or may not be still necessary to add water in one form or another. However, it is recommended according to the present invention to pre-dry very moist brown coal to a water content below 20 percent, before it is introduced into the mixer. It can be advantageous to reduce the water, respectively moisture content provided with the mixing of the components on the way up to the pressing operation. The most favorable moisture content for the pressing operation depends up to a determined extent upon the nature of the employed fuel material; thus with brown coal as an example, it is generally those with higher contents that are pressed. In the case of anthracite, on the other hand, lower moisture content are sufficient. A more favored range for the pressing of anthracite-containing mixtures lies e.g. at a water or moisture content of approximately 2 up to 3 percent.

The water content can be reduced in known manner on the way from the mixer operation up to the pressing, e.g. by means of the evacuation in a vacuum or driving off of the steam, frequently designated broth vapor or simply just vapor.

The briquettization operation can be performed with simple, customary briquettization techniques. It is not necessary to employ any particular process technique, whereby machines and apparatus that are already customarily present can be employed. Suitable briquettization arrangements include, for example, roller presses, ring presses, matrix presses and the like. This listing is in no means intended by the applicant to be anything other than illustrative. Further particulars about customary briquettization technique are given in Ullmanns Encyclopadie der Technischen Chemie (4th edition, volume 2, pages 314–320) as well as in Ullmanns Encyclopadie der Technischen Chemis (3rd edition, pages 380 et seq.).

The briquetting operation, i.e. the pressing of the briquettization material, can likewise be performed in customary manner and at customary temperatures. Not only a cold briquetting but also a warm briquetting are possible.

Part of the employed calcium oxide can be substituted by calcium hydroxide. A common form of calcium hydroxide is lime milk or dissolved lime.

In connection herewith the calcium oxide can be substituted up to an extent of about 50 MOL-% by the corresponding amount of calcium hydroxide. Preferably, the calcium oxide is substituted to an amount up to 20 percent by calcium hydroxide.

In the event that high viscosity polyvinyl solutions are employed, it is practical to heat the briquettization material in connection with the mixing, in order that there may occur a better intermixing and distribution.

The briquettes can be hardened after the pressing operation, in customary manner. Expediently, the hardening is performed at room temperature; it is not necessary to perform a hardening at higher temperatures.

The fuel briquettes according to the present invention display already after a brief period, namely twenty minutes after the pressing operation, a very high strength, i.e. a high so-called initial strength, and can accordingly be removed as quickly as possible from the transporting mechanism after exiting from the briquettization press, and either then initially placed in storage or be transported further. The briquettes harden further—from this point in time—for a certain period, and retain their so-called final strength after a time period of about one week after the pressing. Accordingly, the trommel strengths given within the scope of the present invention represent end strengths, which have been determined after a storage of approximatelly one week.

A while series of briquettization technique is performed with a so-called pre-compressing of the briquettization material; within the scope of the present invention, however, it is not necessary to perform such a pre-compression. However, it is possible within this invention to supplement the briquettization operation with such a pre-compression.

It was particularly surprising that the process according to the present invention leads to briquettes with outstanding mechnical characteristics. Thus, in particular initial strengths, i.e. cold pressing strenghts, determined twenty minutes after the pressing operation, of grater than 100N/cm$^2$ are obtained. In many instances values of above 250N/cm$^2$ are obtained. In addition the warm press strengths of the obtained briquettes are excellent.

Based upon the good initial strengths, the obtained briquettes are very well handelable and, already a short time after the pressing operation can be loaded, stored and transported.

It was particularly surprising that the obtained fuel briquettes according to the present invention are very water-fast and therefore are extensively durable as against the influences of weathering, such as e.g. rain, and retain their shape and their mechanical characteristics to the necessary extent.

The fuel briquettes according to the present invention display a very good abrasion behavior, which makes itself manifest particularly also in a high trommel strength. The high trommel strength is furthermore an indication of the uniform structure of the briquettes and the good interior holding together of the material and the lack of inhomogeneities or areas within the briquettes which display an insufficient or decreased bonding.

It is particularly surprising that through the use of polyvinyl alcohol and calcium oxide and/or magnesium oxide one can achieve low-exhaust briquettes which, when lower-volatile coal such as anthracite has been employed, possess "Russ" tar numbers that lie below 50.

The efficiency of the fuel briquettes according to the present invention is very good; the extent of riddlings is low and lies within very favorable ranges not only with maximal combustion load, but also with low loading.

The "Russ" tar number is determined according to a method as described in Gluckauf-Forschungshefte 36 (4) 157, column 1 (1975).

The trommel strength is an indication for the holding behavior of the briquettes. The extent of the rubbings or fines is a measure of the loss occurring upon loading and storage of the briquettes.

The trommel strength is determined in a trommel with a diameter of 250 mm diameter and a length of 150 mm. Inside of the trommel is located, in each case at about 90°, a 20 mm wide cross-piece with promotes the briquettes upwardly. During the testing, the trommel is rotated about 100 times in four minutes. The rubbings are determined gravimetrically.

The pressed strength determinations are performed with a 60 kN testing press of the firm Losenhausen Werk Dusseldorf, Dusseldorf-Grafenberg (West Germany) between two 15 mm diameter So as to provide plan parallel surfaces for the W strength determination, briquettes employed for the testing are selected so as to display a semi pillow shape and flattened on the pillow side.

The invention will be illustrated by the following examples of specific embodiments which are not meant to be anything more than illustrative of the scope of the present invention.

DESCRIPTION OF THE PREFERRED EMBODIMENTS

Example One 98 kg anthracite having a granulation from 3-0 mm and a water content of 2 percent are warmed in a heated mixer within twenty minutes to 80° C. 1 kg polyvinyl alcohol (MOWIOL-4-98), dissolved in 5.6 kg water, is mixed in for fifteen minutes. Then follows an addition of 1 kg burnt lime. The total mixing period amounts to forty minutes. By means of heating and following from the heat of reaction thereby set free, the temperature rises. The water content of the mixture is then lowered to the start of the pressing operation by means of vacuum evaporation of the vapor to 2.2 percent. The pressing operation is next performed with the aid of a roller press.

After twenty minutes, the briquettes display a strength of 131N/cm$^2$. The end strength amounts to 390N/cm$^2$. The trommel strength amounts to 92 percent.

Example Two 97 kg anthracite are intermixed and briquetted as described in Example One with the same amount of aqueous solution of polyvinyl alcohol, however with 2 kg burnt lime. The strengths amount to after twenty minutes with a water content of 2 percent, 174N/cm$^2$, and after eight days, 371N/cm$^2$. The trommel strength amounts to 86 percent.

Example Three 97 kg anthracite and 2 kg polyvinyl alcohol granulates (MOWIOL 4-98) are warmed for twenty minutes in a heating mixer to a temperature of 80° C. The activation of the binding agent follows by means of the addition of steam. The temperature of the mixture rises to 100° C. The water content becomes 8 percent. After fifteen minutes an addition of 1 kg burnt lime is performed. The water content is reduced up until the pressing to 3 percent. The final strength amounts to 450N/cm$^2$.

Example Four 0.5 kg polyvinyl alcohol (MOWIOL 4-98) dissolved in 2.8 kg water is added and intermixed with 98.5 kg anthracite having a water content of 0.5 percent. The addition of 1 kg burnt lime is effected after fifteen minutes. The total time of mixing amounts to thirty minutes. The pressing operation is effected with the mixture having a water content of 2.3 percent. After eight days, 125N/cm$^2$ final strength is obtained.

Example Five

This test is performed as in Example Two, however it was instead of the completely saponified MOWIOL 4-98 a partially saponified polyvinyl alcohol type MOWIOL 4-98 is employed. The determined strengths come to 90N/cm$^2$ after twenty minutes, and 333 N/cm$^2$ after eight days.

We claim:

1. A fuel briquette having a trummel strength of at least 80% and an initial press strength of 90 to 250N/cm$^2$, obtained by briquettization of a mixture consisting essentially of a substantially solid fuel material selected from the group consisting of hard coal, coke, brown coal, wood coal, and mixtures thereof; 0.5 to 2% polyvinylalcohol; and 0.5 to 4.5% of at least one oxide selected from the group consisting of calcium oxide and magnesium oxide, in the presence of at least 1.0% by weight water.

2. Fuel briquettes according to claim 1, wherein comprising low-volatile hard coal as said fuel material.

3. Fuel briquettes according to claim 1, wherein said low-volatile hard coal comprises anthracite.

4. Fuel briquettes according to claim 1, characterized by an initial press strength from 100 to 250N/cm$^2$, said initial press strength being measured following a hardening period of 20 minutes after pressing operation thereof.

5. Fuel briquettes according to claim 1, wherein said trommel strength amounts to at least 90 percent.

6. Fuel briquettes according to claim 1, characterized by a carbon tar number comprising less than 50.

7. A fuel briquette having a trummel strength of at least 80% and an initial press strength from 90 to 250 cm$^2$ which consists essentially of:
 (a) at least 95% by weight of pulverized anthracite coal;
 (b) 0.5 to 2% by weight of polyvinyl alcohol;
 (c) 1 to 3% by weight of the calcium oxide, magnesium oxide, or mixtures thereof; and
 (d) 2 to 3% water.

8. The fuel briquette defined in claim 7 having a carbon tar number less than 50.

* * * * *